United States Patent [19]
Lagoni et al.

[11] Patent Number: 5,191,420
[45] Date of Patent: Mar. 2, 1993

[54] VIDEO SYSTEM WITH FEEDBACK CONTROLLED "WHITE STRETCH" PROCESSING AND BRIGHTNESS COMPENSATION

[75] Inventors: William A. Lagoni; Robert L. O'Brien, both of Indianapolis, Ind.

[73] Assignee: Thomson Consumer Electronics, Inc., Indianapolis, Ind.

[21] Appl. No.: 808,328

[22] Filed: Dec. 16, 1991

[51] Int. Cl.$^5$ .................. H04N 5/57; H04N 5/52; H04N 9/77
[52] U.S. Cl. ............................ 358/168; 358/169; 358/39; 358/174
[58] Field of Search ............... 358/168, 169, 174, 39

[56] References Cited

U.S. PATENT DOCUMENTS

| | | | |
|---|---|---|---|
| 4,489,349 | 12/1984 | Okada | 358/168 |
| 4,599,643 | 7/1986 | Harlan | 358/74 |
| 4,980,756 | 12/1990 | Lagoni | 358/169 |
| 5,003,394 | 3/1991 | Lagoni | 358/168 |

Primary Examiner—John K. Peng
Attorney, Agent, or Firm—Joseph S. Tripoli; Peter M. Emanuel; Thomas F. Lenihan

[57] ABSTRACT

A non-linear (e.g., "white stretch") processor and a brightness control processor are coupled in cascade between an input for receiving a video input signal to be processed and an output for providing a processed video output signal. A control signal for controlling the transfer characteristics of the non-linear processor is provided by an amplifier having a first input coupled to receive an average picture level (APL) indicating signal derived from the processed video output signal and having a second input coupled to receive a reference level signal supplied thereto. A brightness control signal is applied to a control input of the brightness control processor for controlling the brightness level of the processed video output signal. Circuit means are provided for deriving at least a portion of the reference level signal for the amplifier from the brightness control signal supplied to the brightness control processor thereby reducing a tendency for variations in the brightness control signal to alter the transfer characteristics of the non-linear processor.

5 Claims, 4 Drawing Sheets

VIDEO SYSTEM WITH FEEDBACK CONTROLLED "WHITE STRETCH" PROCESSING AND BRIGHTNESS COMPENSATION

FIELD OF THE INVENTION

This invention relates to video signal processing apparatus and particularly to apparatus employing non-linear video processing controlled by feedback for enhancing certain parameters of displayed images.

BACKGROUND OF THE INVENTION

In television systems, it is known to reduce one or both of the contrast and brightness of a reproduced image in order to inhibit "white-spot blooming" due to excessive electron beam currents of the cathode ray tube (CRT) displat device, as well as to inhibit CRT drive and phosphor amplifier saturation which tend to limit the "slew" rate of the electron beam. This may be accomplished by directly sensing the beam current and, in response, generating a control signal for the contrast and/or brightness control sections of the system. The control signal may also be generated by detecting a characteristic of a video signal coupled to the cathode ray tube. For example, U.S. Pat. No. 4,599,643, entitled "Apparatus Responsive To Plural Color Video Signals For Amplitude Limiting The Video Signals To Assist Beam Current Limiting", issued to W. E. Harlan, discloses combining the three color signals coupled to the cathode ray tube and detecting the average of the white-going peaks of resulting signal above a predetermined threshold to generate a contrast control signal.

In U.S. Pat. No. 5,003,394 entitled DYNAMIC VIDEO SYSTEM INCLUDING AUTOMATIC CONTRAST AND "WHITE STRETCH" PROCESSING SECTIONS" which issued to W. A. Lagoni Mar. 26, 1991, it is recognized that, while it is desirable to prevent spot blooming, for example, by automatically controlling the contrast of the reproduced image, such contrast reduction may reduce the contrast and subjective brightness of the reproduced image. More specifically, Lagoni recognized that while it is desirable to provide automatic contrast control apparatus to reduce the amplitude of the luminance signal when the reproduced image includes white-going peaks exceeding a predetermined level corresponding, e.g., to characters, mid-range luminance amplitudes will also be reduced. This results in a contrast and subjective brightness reduction.

To overcome this problem, Lagoni proposed a system in which a non-linear amplitude control section (hereinafter a "white stretch" processor) is coupled in cascade with the contrast control unit to dynamically emphasize mid-range amplitude luminance levels relative to high amplitude luminance levels as a function of the average value of the luminance signal processed by the contrast control apparatus. For images containing excessive white-going peaks but a low level average luminance component (hereinafter, a low "average picture level" or "APL"), the effect is to decrease the amplitude of the white-going peaks while simultaneously increasing the amplitude of mid-range luminance levels. In this way, "white spot blooming" (as well as CRT phosphor and driver saturation) can be minimized while providing subjectively sharp, bright images.

SUMMARY OF THE INVENTION

In a specific embodiment of the Lagoni apparatus discussed above the system includes a non-linear or "white stretch" processor, a contrast control unit and a brightness control unit coupled in cascade. Average and peak detectors connected to the output of the cascade connection provide indication of the average and peak values of the processed video output signal. The non-linear or "white stretch" processor is controlled by a feedback signal developed by comparing the "APL" or average indicating signal with a reference level. The contrast control unit is controlled by feedback also, the feedback being provided by comparing a peak video signal level indicating signal a further reference level signal.

The present invention resides in part in the discovery that an undesirable interaction exists between the brightness control and the non-linear or "white stretch" processing. Specifically, if a user adjusts the brightness control to a relatively high setting, the non-linear (white stretch) processing tends to be suppressed resulting in a displayed image in which low and midrange luminance signals are emphasized to a lesser extent. Conversely, if the brightness control is adjusted by a user to a relatively low value, this results in an increase in the non-linear (white stretch) processing which tends to over-emphasize amplification of the luminance signal for dark and medium brightness scenes.

The present invention resides in part in the recognition of the foregoing undesirable interaction between the non-linear (white stretch) processing and operation by the user of the brightness control.

In accordance with the invention, the foregoing undesirable interaction may be minimized by deriving at least a portion of the reference signal level for the non-linear (white stretch) processor from the brightness control signal.

In the following examples of the invention, one example will be given demonstrating that if all of the reference signal level for the non-linear (e.g., white stretch) processor is derived from the brightness control signal, there will be no interaction at all between the non-linear and brightness control sections. Other examples will be given showing the desirable effects of attenuating and off-setting the brightness control signal for developing the non-linear (white stretch) processing reference signal.

Video signal processing apparatus, embodying the invention, comprises input means for providing a video input signal to be processed and output means for providing a processed video output signal. A a non-linear video signal processor is coupled in cascade with a brightness control signal processor between said input and output means. An amplifier is provided, having a first input coupled to receive an average picture level (APL) indicating signal, having a second input for receiving a reference level signal and having an output coupled to supply a control signal to a control input of said non-linear video signal processor for controlling a transfer characteristic thereof. Means are provided for applying a brightness control signal to a control input of said brightness control processors thereof for controlling the brightness of said processed video output signal. Circuit means a provided for deriving at least a portion of said reference level signal for said amplifier from said brightness control signal supplied to said brightness control processor so as to reduce a tendency for variations in the brightness control signal to alter the non-linear transfer characteristic of the non-linear processor.

In an embodiment of the invention, described herein, the reference signal for the amplifier is derived solely from the brightness control signal. In another embodiment of the invention, the reference signal is obtained by attenuating the brightness control signal and adding a relatively positive DC offset thereto. In a further embodiment of the invention the reference signal is obtained by attenuating the brightness control signal and adding a relatively negative DC offset thereto.

BRIEF DESCRIPTION OF THE DRAWING

The foregoing and further features of the invention are illustrated in the accompanying drawing where like elements are denoted by like reference designators and in which.

DETAILED DESCRIPTION

Figure 1:
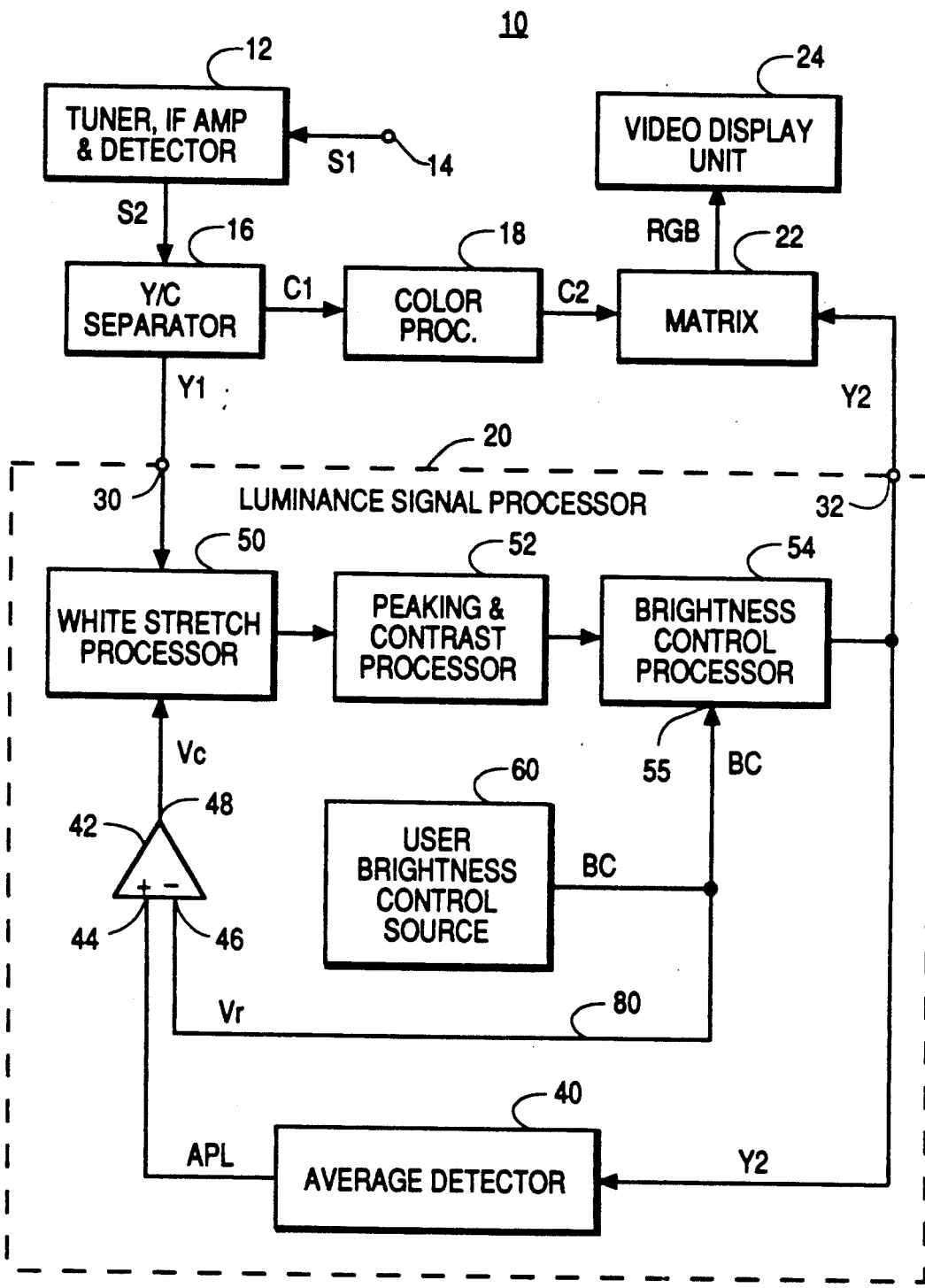
FIG. 1 is a block diagram of a television receiver embodying the invention wherein a reference signal for an amplifier is derived solely from a brightness control signal supplied thereto.

The television receiver 10 of FIG. 1 includes a TUNER, IF AMPLIFIER AND DETECTOR unit 12 having an input 14 for receiving an RF modulated TV input signal S1 from a suitable source (e.g., an antenna, a cable or some other source) and providing a base band composite video output signal which is applied to a luminance/chrominance signal separator circuit 16 which separates the baseband signal S2 into a chrominance component C1 and a luminance component Y1. The separated components are applied to respective ones of a color processor 18 and a luminance signal processor 20 which provide respective processed output signals C2 and Y2. The chrominance processor 18 may be of conventional design for providing functions such as hue and tint control. The luminance signal processor, embodying the invention, will be described later.

After chrominance and luminance signal processing in units 18 and 20 the processed signals C2 and Y2 are applied to a matrix circuit 22 which converts the processed luminance signals to component form (e.g., RGB form) for display by a video display unit 24. This unit may comprise a direct view kinescope or a projection type of display and associated diver amplifiers. To simplify the drawing, details of the sound processing and the display sweep processing are not shown as these details are not related to the invention.

The luminance signal processor 20 embodies the invention and includes an input terminal 30 to which the luminance signal Y1 is applied and an output terminal 32 for providing the processed luminance output signal Y2.

The luminance signal processor 20 further includes a source 40 comprising an average picture level (APL) detector having an input coupled to output terminal 32 and an output for providing an average picture level (APL) indicating signal APL.

An amplifier 42 is provided having a first (non-inverting) input 42 to which the average picture level (APL) indicating signal is applied, having a second input to which a reference level signal Vr is applied and having an output 48 for providing a control signal (Vc) representative of a difference between the input signals supplied to the amplifier 42.

A non-linear processor 50, which may comprise a so-called "white stretch" processor as described in the aforementioned Lagoni patent, is provided for applying non-linear processing to the luminance signal Y1. This processor is coupled in cascade with a peaking and contrast processor 52 and a brightness control processor 54 between terminals 30 and 32. Suitable implementations of these processors are described in the aforementioned Lagoni patent. These processors provide non-linear (e.g., white stretch) processing, peaking, contrast control and brightness control processing to the luminance signal Y1.

A user brightness control signal source 60 provides a brightness control signal BC to the input 55 of the brightness control processor 54 for controlling the brightness of images displayed on display unit 24. This source may comprise a potentiometer to which a supply voltage is applied and having an output tap for providing a variable brightness control voltage. In a preferred application it may comprise a digital to analog voltage converter coupled to the output of the receiver control microprocessor as is conventional practice in modern television receivers. For purposes of the following discussing, it will be assumed that the brightness control signal increases in a positive direction when the user selects a brighter display.

Figure 2:
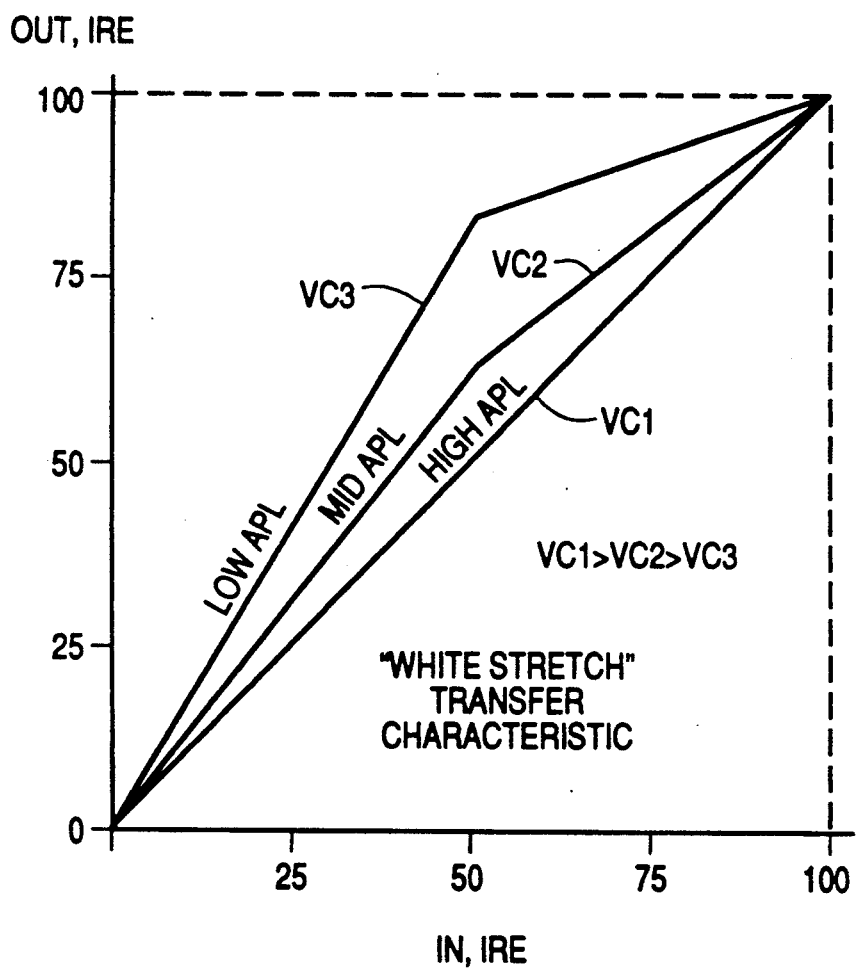
FIG. 2 is a diagram illustrating the transfer characteristics of a "white stretch" type of non-linear processor suitable for use in the example of FIG. 1.

The control voltage Vc developed by the amplifier 42 is applied directly to the control input of the white stretch processor 50 for controlling the input-output transfer characteristic thereof. This characteristic is illustrated in FIG. 2 where it is shown that an increase in the control signal Vc results in a reduction in non-linearity of the processed video signal and a decrease in the control voltage Vc results in an increase in non-linearity of the processed video signal. As explained in the aforementioned patent, this processing desirably provides enhanced contrast for displayed images in that the contrast level of low or mid level images is enhanced.

The luminance signal processor of FIG. 1 further includes means, comprising an electrical conductor 80, for deriving at least a portion of the reference signal VR supplied to the second input (46) of the amplifier 50 from the brightness control signal BC provided by the brightness control signal source 60 which is supplied to the brightness control input 55 of the brightness control signal processor 54.

The foregoing means, e.g., conductor 80, provides provides the advantage, in this embodiment of the invention, of completely eliminating the previously described undesirable interaction between the brightness control and the non-linear (white stretch) processing as will now be described in the following examples of overall circuit operation.

As a first example, assume, as in the aforementioned Lagoni patent, that the reference voltage Vr is a fixed (i.e., non-varying) voltage. For this case, any change at all in the in the average picture level APL will alter the control voltage Vc and so will also alter the non-linearity provided by the white stretch circuit. For example, an increase in the user brightness control signal BC will increase the average picture level and so will increase the value of the control signal Vc thereby resulting in the non-linear processing provided by processor 50. Conversely, with a fixed value of Vr, any decrease in the user brightness control signal BC will increase the average picture level and so sill decrease the values of the control signal Vc thereby resulting in the non-linear processing provided by processor 50.

In accordance with the invention, the undesirable interaction of the user brightness control 60 with the operation of the white stretch processing 50 is avoided completely by mean of electrical conductor 80 which applies the brightness control signal BC directly as the reference voltage Vr to the inverting input 46 of the amplifier 42. By this means, any change what-so-ever in the value of the user brightness control signal BC is completely off-set by the change in the reference voltage Vr applied to amplifier 42 and so has no effect at all on the value of the control voltage Vc. As an example, an increase of 100 mV in signal BC will result in an increase in 100 mV in signal Vr and so the output of amplifier 42 will remain constant since the APL signal will also increase by the same amount. In other words, As a result, the user may alter the values of the brightness control signal BC and so change the average picture level APL of displayed images without changing, in any manner, the characteristics of the non-linear processing imparted to the luminance signal Y2 by the non-linear (white stretch) processor 50.

Advantageously, by making the white stretch processor 50 independent of the setting of the user brightness control 60, images are displayed of improved contrast regardless of the setting of the user brightness control.

Figure 3:
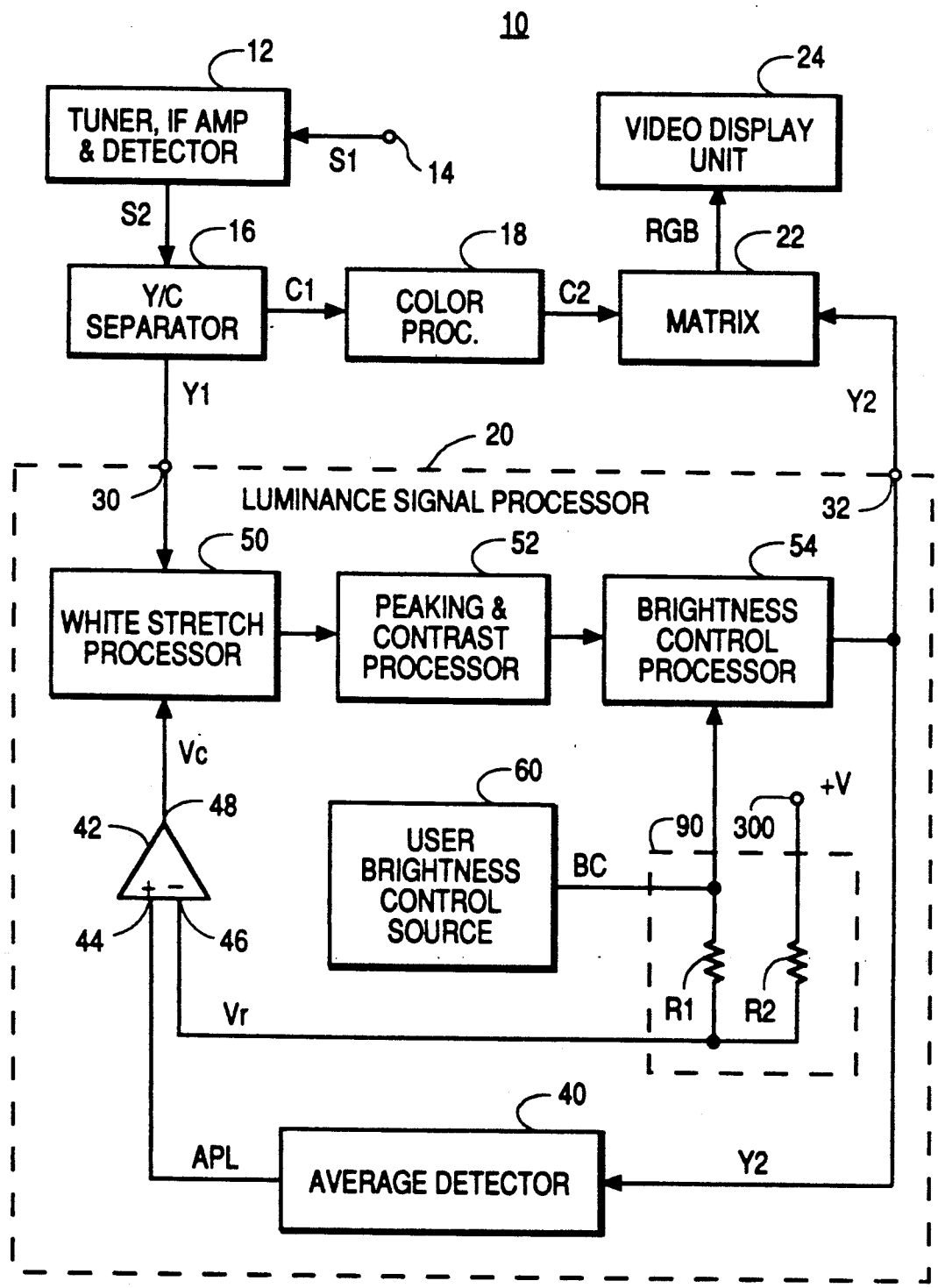
FIG. 3 is a block diagram of a second embodiment of the invention wherein the reference signal for the amplifier is derived by attenuating the brightness control signal and adding a relative positive DC offset thereto.
Figure 4:
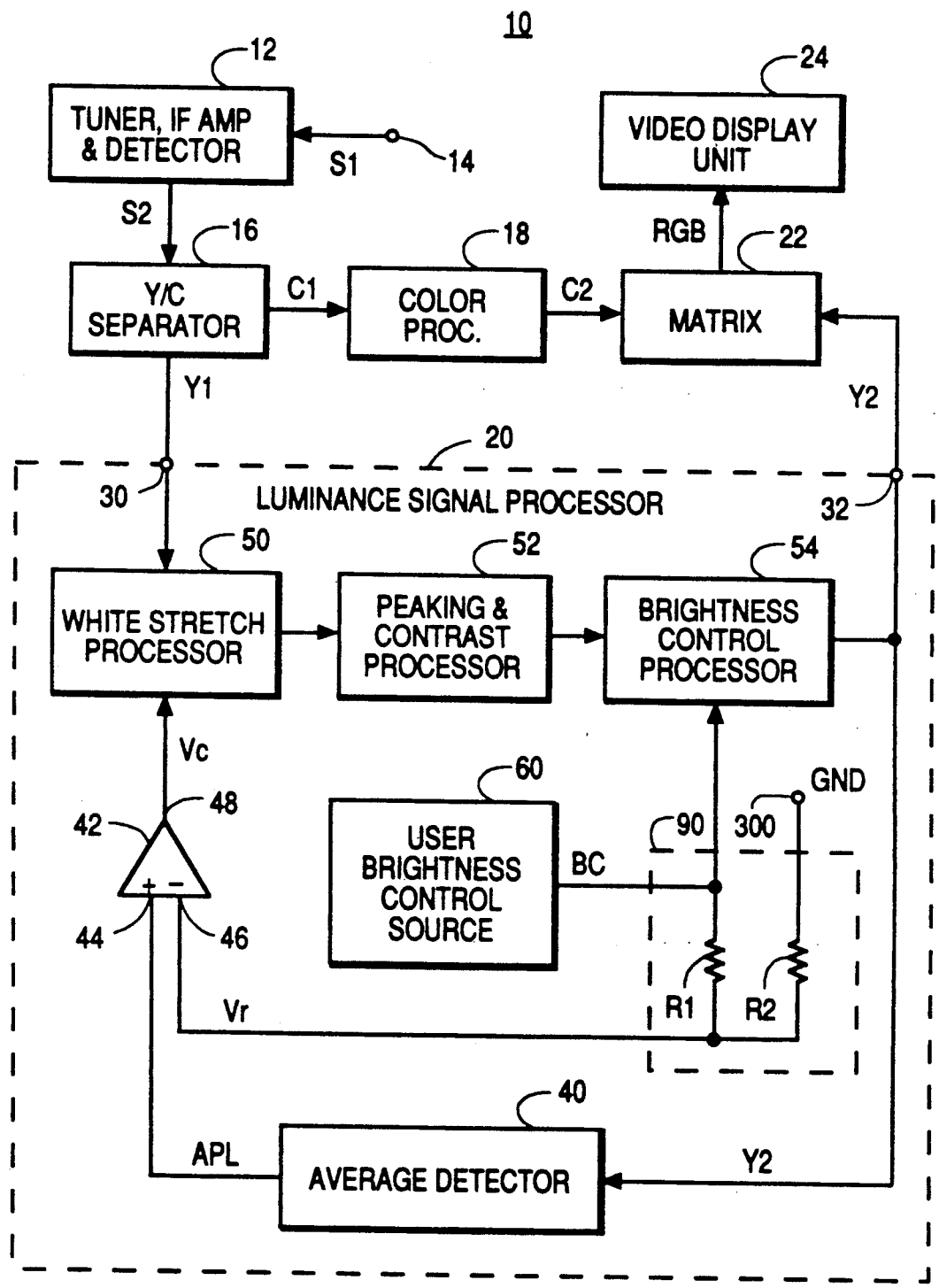
FIG. 4 is a block diagram of a third embodiment of the invention wherein the reference signal for the amplifier is derived by attenuating the brightness control signal and adding a relatively negative DC offset thereto.

FIGS. 3 and 4 illustrate two modifications of the apparatus of FIG. 1 which represent compromise conditions of interaction between the user brightness control and the non-linear characteristic processing provided by white stretch processor 50. In FIG. 3 the signal BC is attenuated and offset by means of a network 90 comprising a resistor R1, a resistor R2 and a terminal 300. Specifically, network 90 comprises a connection of resistor R1 to the input 46 of amplifier 42 and a connection of resistor R2 from the input 46 of amplifier 42 to a source 300 of relative positive potential +V. In operation, the network 90 derives the reference voltage Vr by attenuating (R1,R2) the brightness control signal BC and adding a relatively positive offset voltage (+V).

Some effects of this modification are to provide a higher level of the reference voltage Vr with a measured contribution of the brightness control signal BR. Visually, the effect is to increase the threshold at which non-linearities provided by processor 50 take effect and to decrease the non-linearities as a percentage of the brightness control signal (e.g., in proportion to the resistance ratio R1/(R1+R2)). The example of FIG. 4 is similar except that terminal 300 is grounded. This modification provides a lower level of the reference voltage Vr with a measured contribution of of the brightness control signal BR. Visually the effect is to decrease the threshold at which non-linearities provided by processor 50 take effect and to add an attenuated contribution of the brightness control signal BC (the attenuation being determined by the ratio R1/(R1+R2)).

There has been shown an described herein video signal processing apparatus including input means (30) for providing a video input signal (Y1) to be processed and output means (32) for providing a processed video output signal (Y2). A non-linear video signal processor (50) is coupled in cascade with a brightness control signal processor (54) between the input (30) and the output means (32). An amplifier means (42) having a first input (44) coupled to receive an average picture level (APL) indicating signal, having a second input (44) coupled to receive a reference level signal (Vr) and having an output (48) coupled to supply a control signal (Vc) to a control input of a non-linear processor (50) for controlling a transfer characteristic thereof. Means(60) are shown for applying a brightness control signal (BC) to a control input (55) of a brightness control signal processor (54) for controlling the brightness of the processed video output signal (Y2). Additionally, circuit means (80; R1,R2,+V; R1,R2,Gnd) have been shown for deriving at least a portion of the reference level signal (Vr) for the amplifier (42) from the brightness control signal BC supplied to the brightness control processor (54).

Various changes and modifications may be made to the video signal processing apparatus described herein by the three specific examples given. The processing, for example, may be provided by either digital or analog signal processing means. Other changes will be apparent to workers of ordinarily skill in the art. The invention is defined by the appended claims.

What is claimed is:

1. Apparatus, for use in a television system, comprising:
    input means for providing a video input signal to be processed;
    output means for providing a processed video output signal;
    a source for providing a brightness control signal;
    a source responsive to said processed video output signal for providing an average picture level indicating signal;
    amplifier means having a first input to which said average picture level indicating signal is applied, having a second input to which a reference level signal is applied and having an output for providing a control signal representative of a difference between the input signals supplied to said amplifier means;
    a non-linear processor and a brightness control processor coupled in cascade between said input means and said output means for applying non-linear processing and brightness control to said processed video output signal;
    first means for applying said brightness control signal to a brightness control input of said brightness control processor for controlling the brightness of said processed video output signal;
    second means for applying said control signal provided by said amplifier means to a control input of said non-linear processor for controlling a transfer characteristic of said non-linear processor; and
    means for deriving at least a portion of said reference signal supplied to said second input of said amplifier means from said brightness control signal supplied to said brightness control processor.

2. Apparatus as recited in claim 1 wherein:

said means for deriving said reference signal comprises means for applying said brightness control signal directly to said second input of said amplifier means so that substantially all of said reference signal is obtained from said brightness control signal.

3. Apparatus as recited in claim 1 wherein:

said means for deriving said reference signal comprises means for attenuating said brightness control signal and adding a relatively positive DC offset thereto.

4. Apparatus as recited in claim 1, wherein:

said means for deriving said reference signal comprises means for attenuating said brightness control signal and adding a relatively negative DC offset thereto.

5. Video signal processing apparatus, comprising:

input means for providing a video input signal to be processed and output means for providing a processed video output signal;

a non-linear video signal processor coupled in cascade with a brightness control signal processor between said input and output means;

amplifier means having a first input coupled to receive an average picture level (APL) indicating signal, having a second input for receiving a reference level signal and having an output coupled to supply a control signal to a control input of said non-linear video signal processor for controlling a transfer characteristic thereof;

means for applying a brightness control signal to a control input of said brightness control processors thereof for controlling the brightness of said processed video output signal;

circuit means for deriving at least a portion of said reference level signal for said amplifier from said brightness control signal supplied to said brightness control processor.

* * * * *